US012574106B2

(12) United States Patent
Lee

(10) Patent No.: US 12,574,106 B2
(45) Date of Patent: Mar. 10, 2026

(54) MULTI-VENDOR GROUND STATION INTEGRATED CONTROL SYSTEM

(71) Applicant: CONTEC CO., LTD., Daejeon (KR)

(72) Inventor: Sunghee Lee, Sejong-si (KR)

(73) Assignee: CONTEC CO., LTD., Daejeon (KR)

( * ) Notice: Subject to any disclaimer, the term of this patent is extended or adjusted under 35 U.S.C. 154(b) by 381 days.

(21) Appl. No.: 18/345,716

(22) Filed: Jun. 30, 2023

(65) Prior Publication Data

US 2024/0178910 A1    May 30, 2024

Related U.S. Application Data

(63) Continuation of application No. PCT/KR2022/019186, filed on Nov. 30, 2022.

(30) Foreign Application Priority Data

Nov. 30, 2022    (KR) ........................ 10-2022-0163834

(51) Int. Cl.
*H04B 7/185* (2006.01)
*H04W 76/10* (2018.01)

(52) U.S. Cl.
CPC ........ *H04B 7/18517* (2013.01); *H04W 76/10* (2018.02)

(58) Field of Classification Search
CPC ... H04W 76/10; H04B 7/185; H04B 7/18517; H04B 7/18519
See application file for complete search history.

(56) References Cited

FOREIGN PATENT DOCUMENTS

| | | | | |
|---|---|---|---|---|
| JP | 2014-157622 | A | 8/2014 | |
| JP | 2014157622 | * | 8/2014 | ............. G06F 13/00 |
| KR | 10-0221844 | B1 | 9/1999 | |
| KR | 10-0321764 | B1 | 6/2002 | |
| KR | 10-2019-0020491 | A | 3/2019 | |
| KR | 10-2019-0091867 | A | 8/2019 | |
| KR | 20190091867 | * | 8/2019 | ............. H04B 7/185 |

OTHER PUBLICATIONS https://gitlab.com/librespacefoundation/satnogs, (Year: 2014).*
International Search Report issued in PCT/KR2022/019186; mailed Aug. 17, 2023.
An Office Action mailed by the Korean Intellectual Property Office on May 17, 2023, which corresponds to Korean Patent Application No. 10-2022-0163834 and is related to U.S. Appl. No. 18/345,716.

* cited by examiner

*Primary Examiner* — Tuan H Nguyen
(74) *Attorney, Agent, or Firm* — Studebaker Brackett PLLC

(57)    ABSTRACT

A multi-vendor ground station integrated control system according to an example embodiment includes an integrated interface unit configured to provide a ground station integrated interface through which multi-vendor equipment and parts are compatible to operate an artificial satellite, a first processor configured to operably couple to the integrated interface unit and separate dependencies between subsystems when interacting with the subsystems, and a second processor configured to operably couple to vendor equipment having different forms of the ground stations, collect motions generated from the ground stations, and control equipment of the ground stations.

6 Claims, 6 Drawing Sheets

| Ground station ID | Equipment ID | Model ID | Item | OPCODE |
|---|---|---|---|---|
| K07 | ACU | AC4100 | STOW | 0x1001 |

Integrated control

| Ground station ID | Equipment ID | Model ID | Item | Integrated ICD | Type | Individual ICD |
|---|---|---|---|---|---|---|
| J07A | ACU | L3-01 | STOW | 0x1001 | Character string | "SET:STOW" |
| J07B | ACU | XX-01 | STOW | 0x1001 | Code | 0x2004 |
| . | . | . | | | | |
| K07 | ACU | AC4100 | STOW | 0x1001 | Character string | "SYST:STOW" |
| . | . | . | | | | |

FIG. 6

Ground Station

| Name | Lastude | Longitude | Drration | Pre-Pass sec | Post-Pass sec | Bands | Software | Action |
|------|---------|-----------|----------|--------------|---------------|-------|----------|--------|
| Jeju-2 | 33.5426 | 126.816 | 60 | 300 | 180 | VHF, UHF | LGSC | Edit |
| Jeju-1 | 33.5426 | 126.816 | 60 | 60 | 30 | X.S | LGSC | Edit |
| FI04A | 67.8975 | 23.925 | 280 | 60 | 30 | X.S | LCAM | Edit |
| SA06A | 25.860857 | 28.453373 | 1416 | 60 | 30 | X.S | LCAM | Edit |
| SW06A | 65.801186 | 21.67948 | 6.4 | 60 | 30 | X.S | LCAM | Edit |
| IR04A | 51.953674 | -8.174445 | 163.3 | 60 | 30 | X.S | LCAM | Edit |
| AL06A | 70.211608 | -1483411944 | 47 | 60 | 30 | X.S | LCAM | Edit |
| FI04A-2 | 67.8975 | 23.925 | 280 | 60 | 30 | X.S | LCAM | Edit |

MULTI-VENDOR GROUND STATION INTEGRATED CONTROL SYSTEM

CROSS-REFERENCE TO RELATED APPLICATIONS

The present application is a Continuation of International Patent Application No. PCT/KR2022/019186, filed on Nov. 30, 2022, which is based upon and claims the benefit of priority to Korean Patent Application No. 10-2022-0163834 filed on Nov. 30, 2022. The disclosures of the above-listed applications are hereby incorporated by reference herein in their entirety.

TECHNICAL FIELD

The present invention relates to a ground station integrated control system, and more particularly, to a ground station integrated control system through which multi-vendor equipment and parts are compatible to operate an artificial satellite.

RELATED ART

An artificial satellite refers to an object that may fly and move around the earth along a predetermined circular or elliptical orbit. The artificial satellite may be mounted on a launch vehicle and then launched to enter a predetermined orbit in universal space and perform predefined various operations within the orbit. The artificial satellite serves to exchange data with various communication/electronic devices (e.g., satellite antenna and set-top box connected thereto) on the ground and/or observe the surface of the earth, while rotating around the earth along the orbit.

A ground station is installed on the ground to observe (e.g., monitor or control) the artificial satellite or the launch vehicle and to receive data collected by the artificial satellite. The ground station may transmit a control signal for a specific operation (e.g., shooting) to the satellite and/or receive data (e.g., image data of the ground surface) obtained by the satellite based on the specific operation and perform a variety of processing related thereto through communication with the artificial satellite based on a standardized frequency and a communication protocol. In this regard, artificial satellites are launched for various purposes, for example, communication, meteorology, environment, and military, and a large number of satellites are currently being operated and a ground station system is being operated to control the artificial satellites on the ground.

The ground station system refers to a system including a large-scale process to receive observed data from satellites and provide various services. The ground station system may be operated using a plurality of ground stations installed at different locations to transmit signals to satellites or receive signals from the satellites for control of the artificial satellite.

In particular, to build a ground station for satellite communication, a vendor of the ground station is flexible according to technical requirements and a customer request and it is significantly difficult to build the ground station with a single vendor. Also, manufacturers of the ground station system have different characteristics and interfaces even for the same equipment. Even for the same manufacturer, if a model of equipment is changed depending on the year or if software with a different version is used, an incompatibility issue occurs in many cases. Therefore, there is an inconvenience that a system suitable for a corresponding vendor needs to be developed for each ground station.

Accordingly, there is a need for a method that may integrally control and monitor even equipment with the same function from different manufactures, may reduce an amount of time and resources used for developing control software for individual ground station, and may be quickly applied even when equipment is replaced or upgraded.

DETAILED DESCRIPTION

Object

An objective of the present invention is to provide a multi-vendor ground station integrated control system.

Solution

A multi-vendor ground station integrated control system according to an example embodiment of the present invention includes an integrated interface unit configured to provide a ground station integrated interface through which multi-vendor equipment and parts are compatible to operate an artificial satellite; a first processor configured to operably couple to the integrated interface unit and separate dependencies between subsystems when interacting with the subsystems; and a second processor configured to operably couple to vendor equipment having different forms of the ground stations, collect motions generated from the ground stations, and control equipment of the ground stations.

As an example embodiment, the second processor is configured to when equipment of a plurality of manufacturers is connected to the subsystems, obtain state information of the connected equipment of the plurality of manufacturers, and perform control operations related to a stow state and a connect state of the equipment of the ground stations based on the obtained state information of the equipment and motions generated from the ground stations in conjunction with the integrated interface unit and the first processor. When a configuration method of the connected equipment is selected by a user, the control operations is performed based on the selected configuration method of the connected equipment. The equipment information includes antenna diameter, operating frequency, and manufacturer information.

As an example embodiment, the second processor is configured to when new equipment is added to the ground stations, perform control operations related to stow, connect, and disconnect of the new equipment in conjunction with the integrated interface unit and the first processor, and when it is determined that the new equipment is normally stowed and connected and normally compatible with other equipment, transmit a message indicating a normal operation state to the new equipment and the equipment connected to the new equipment.

As an example embodiment, the integrated interface unit includes a controller configured to interface with the subsystems in response to a user request; and a service configuration unit configured to operably couple to the controller, generate a facade object related to an integrated interface between the subsystems, configure a facade pattern, and transmit a first command to the first processor and a second command to the second processor according to the facade pattern.

As an example embodiment, the first processor is configured to operably couple to the service configuration unit, and generate first control commands for controlling the equipment by changing to a command for controlling the controller in response to the first command.

As an example embodiment, the second processor is configured to operably couple to the service configuration unit and generate second control commands related to stow, connect, and disconnect of the equipment in response to the second command, and transmit the generated second control commands to the antenna control units such that the antenna control units control a stow state and a connect state of the equipment.

As an example embodiment, the second processor is configured to generate replacement information related to replacement of at least some of the equipment in response to occurrence of abnormality by monitoring and controlling the equipment of the ground stations, in response to the equipment being replaced according to the generated replacement information, transmit control commands to the antenna control units of the replaced equipment in conjunction with the integrated interface unit and the first processor, control the antenna control units such that the antenna control units control a stow state and a connect state of the replaced equipment, and when it is determined that the replaced equipment are normally stowed and connected and normally compatible with other equipment, transmit a message indicating a normal operation state to the replaced equipment and the equipment connected to the replaced equipment.

Effect

According to an example embodiment of the present invention, it is possible to provide a ground station integrated control system through which multi-vendor equipment and parts are compatible.

According to an example embodiment of the present invention, it is possible to provide a ground station integrated control system in subsystems in which multi-vendor equipment and parts are integrated in subsystems configured with a plurality of ground stations.

According to an example embodiment of the present invention, although parts, such as an antenna, a transceiver, and a modem, are randomly selected, it is possible to analyze a connect state and a compatibility state and to perform an integrated control according thereto through integrated operation software for ground stations.

According to an example embodiment of the present invention, although a product of any manufacturer is connected through integrated operation software for ground stations, it is possible to perform configuration and modularization in a form in which a configuration method may be selected through software.

The additional scope of applicability of the present invention will become apparent from the following detailed description. However, various changes and modifications within the spirit and scope of the present invention may be clearly understood by those skilled in the art and thus, it should be understood that the detailed description and a specific example embodiment such as an example embodiment of the present invention are provided as an example only.

BRIEF DESCRIPTION OF DRAWINGS

FIG. 4 illustrates a configuration of integrating and connecting antenna control units (ACUs) of different vendors to configure the ground station integrated control system of FIG. 3.

FIG. 5 illustrates an example of an integrated ICD of an integrated control system according to the present invention.

FIG. 6 illustrates an example of a registration situation of ground stations connected to a ground station integrated control system according to the present invention.

MODE

Figure 1:
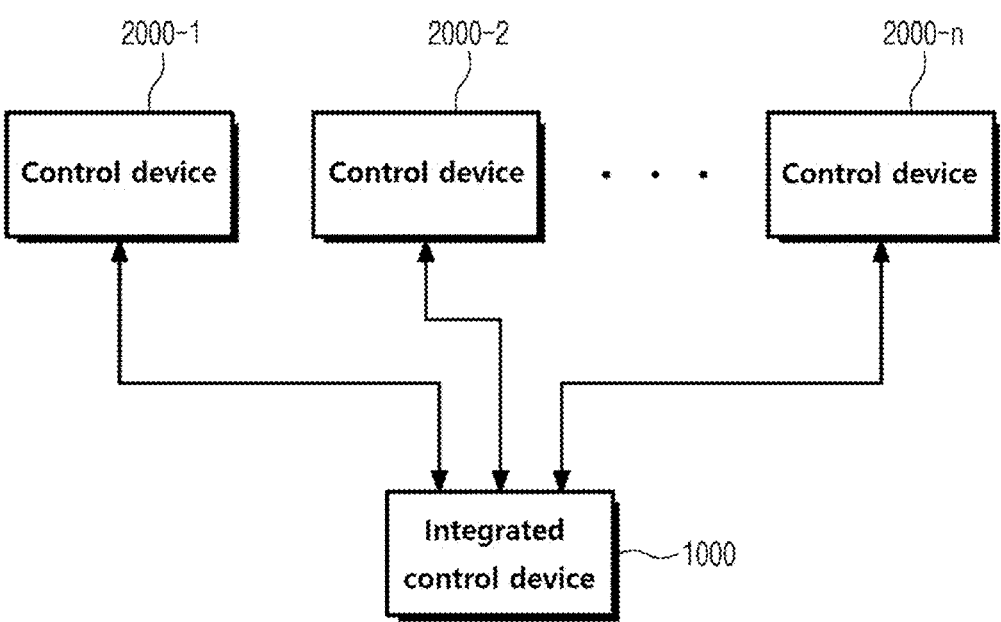
FIG. 1 illustrates an integrated control device that constitutes a multi-vendor ground station integrated control system and control devices that control the respective ground stations.

Various modifications and various forms may be made to example embodiments according to the concept of the present invention and thus, the example embodiments are illustrated in the drawings and described in detail in the present specification.

Although terms of "first," "second," and the like are used to explain various components, the components are not limited to such terms. These terms are used only to distinguish one component from another component. For example, a first component may be referred to as a second component, or similarly, the second component may be referred to as the first component without departing from the scope according to the concept of the present invention.

When it is mentioned that one component is "connected" or "accessed" to another component, it may be understood that the one component is directly connected or accessed to another component or that still other component is interposed between the two components. On the contrary, it should be understood that if it is described in the specification that one component is "directly connected" or "directly accessed" to another component, still other component may not be present therebetween. Likewise, expressions explaining relationship between components, for example, "between" and "immediately between" and "adjacent to" and "immediately adjacent to," may also be construed as described in the foregoing.

The terminology used herein is for the purpose of describing specific example embodiments only and is not to be limiting of the present invention. As used herein, the singular forms "a," "an," and "the" are intended to include the plural forms as well, unless the context clearly indicates otherwise.

It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments of the present invention will be described in detail with reference to the accompanying drawings. However, the scope of the claims is not limited thereto or restricted thereby. Like reference numerals refer to like components throughout.

Hereinafter, a multi-vendor ground station integrated control system according to the present invention is described.

FIG. 1 illustrates an integrated control device that constitutes a multi-vendor ground station integrated control system and control devices that control the respective ground stations.

Figure 2:
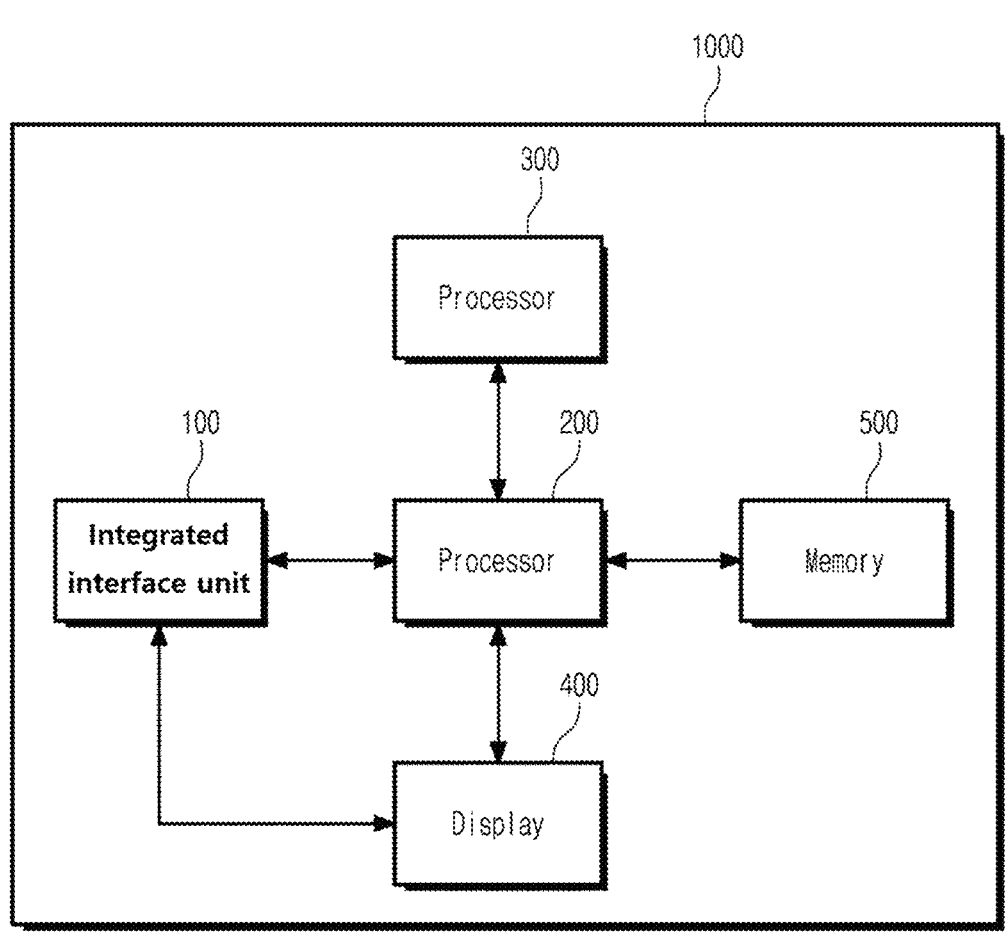
FIG. 2 illustrates a configuration of the integrated control device that configures the ground station integrated control system of FIG. 1.

FIG. 2 illustrates a configuration of the integrated control device that configures the ground station integrated control system of FIG. 1.

Referring to FIG. 1, a ground station integrated control system may include an integrated control device 1000 and control devices 2000-1, 2000-2, . . . , 2000-_n_ configured to control the respective ground stations in conjunction with the integrated control device 1000.

Referring to FIGS. 1 and 2, the integrated control device 1000 may include an integrated interface unit 100, a first processor 200, a second processor 300, a display 400, and a memory 500.

The integrated interface unit 100 may operably couple to interface units of the control devices 2000-1, 2000-2, . . . , 2000-_n_. The first processor 200 and the second processor 300 may operably couple to the integrated interface unit 100, may obtain state information of equipment from the control devices 2000-1, 2000-2, . . . , 2000-_n_, and may obtain information on a stow state, a connect state, and an operation state of equipment and parts.

The second processor 300 may operably couple to the first processor 200 and may control an operation state of each piece of equipment and parts. The first processor 200 may obtain information on a stow state, a connect state, and an operation state of newly added or replaced equipment and parts in conjunction with the second processor 300. The second processor 300 may control an operation of the newly added or replaced equipment and parts based on the stow state, the connect state, and the operation state of newly added or replaced equipment and parts in conjunction with the first processor 200.

The display 400 may operably couple to the integrated interface unit 100. The display 400 may operably couple to at least one of the first processor 200 and the second processor 300. The display 400 may display information on the control devices 2000-1, 2000-2, . . . , 2000-_n_ and equipment and parts connectable thereto through the integrated interface unit 100.

The memory 500 may operably couple to the integrated interface unit 100. The memory 500 may operably couple to at least one of the first processor 200 and the second processor 300. The memory 500 may store information on the control devices 2000-1, 2000-2, . . . , 2000-_n_ and the equipment and the parts connectable thereto obtained through the integrated interface unit 100.

Meanwhile, detailed configuration and operation related to equipment control of a ground station integrated control system according to the present invention are described below with reference to the drawings.

Figure 3:
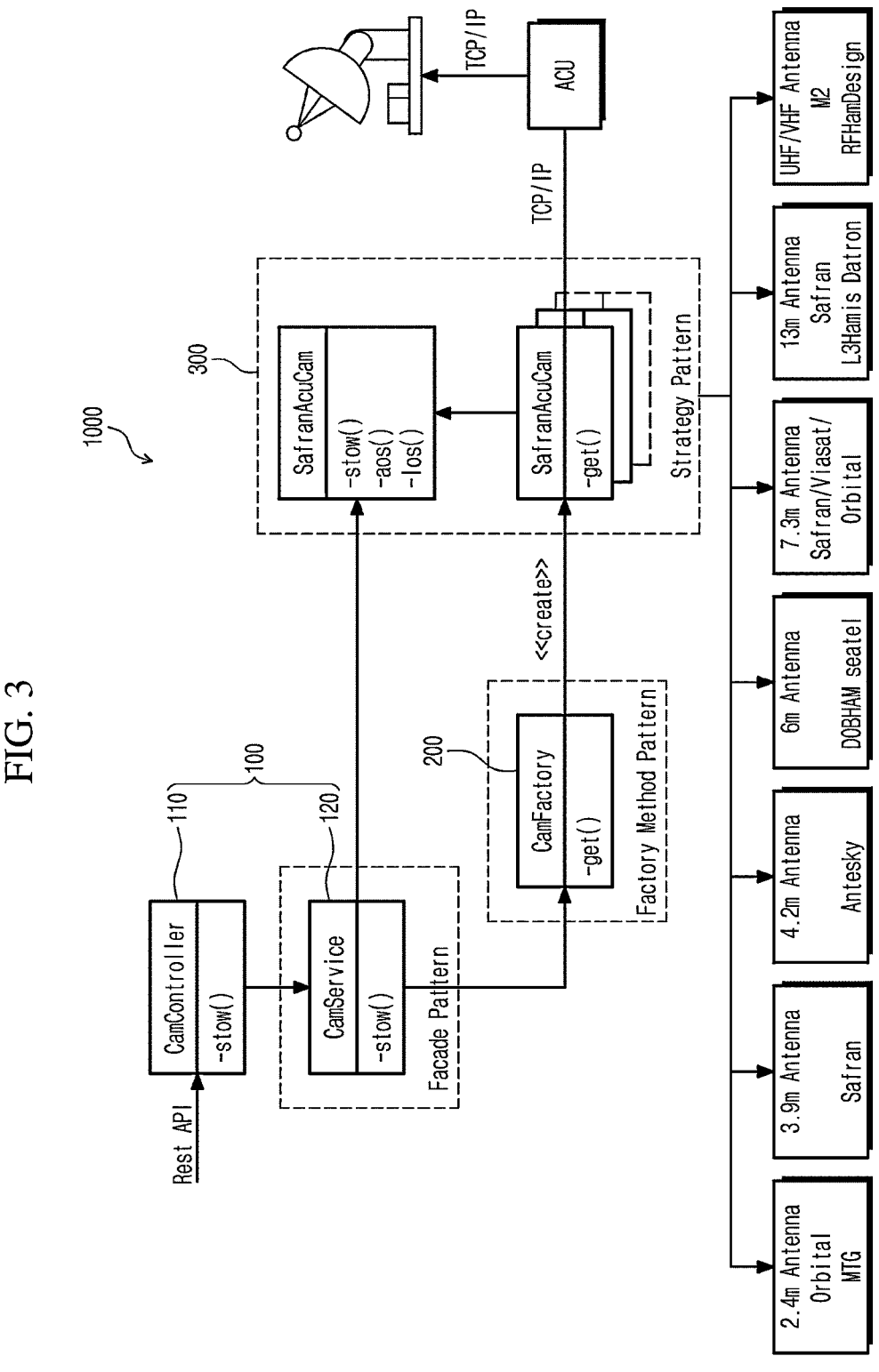
FIG. 3 illustrates detailed configuration and operations related to equipment control of a ground station integrated control system according to the present invention.

FIG. 3 illustrates detailed configuration and operations related to equipment control of a ground station integrated control system according to the present invention.

Figure 4:
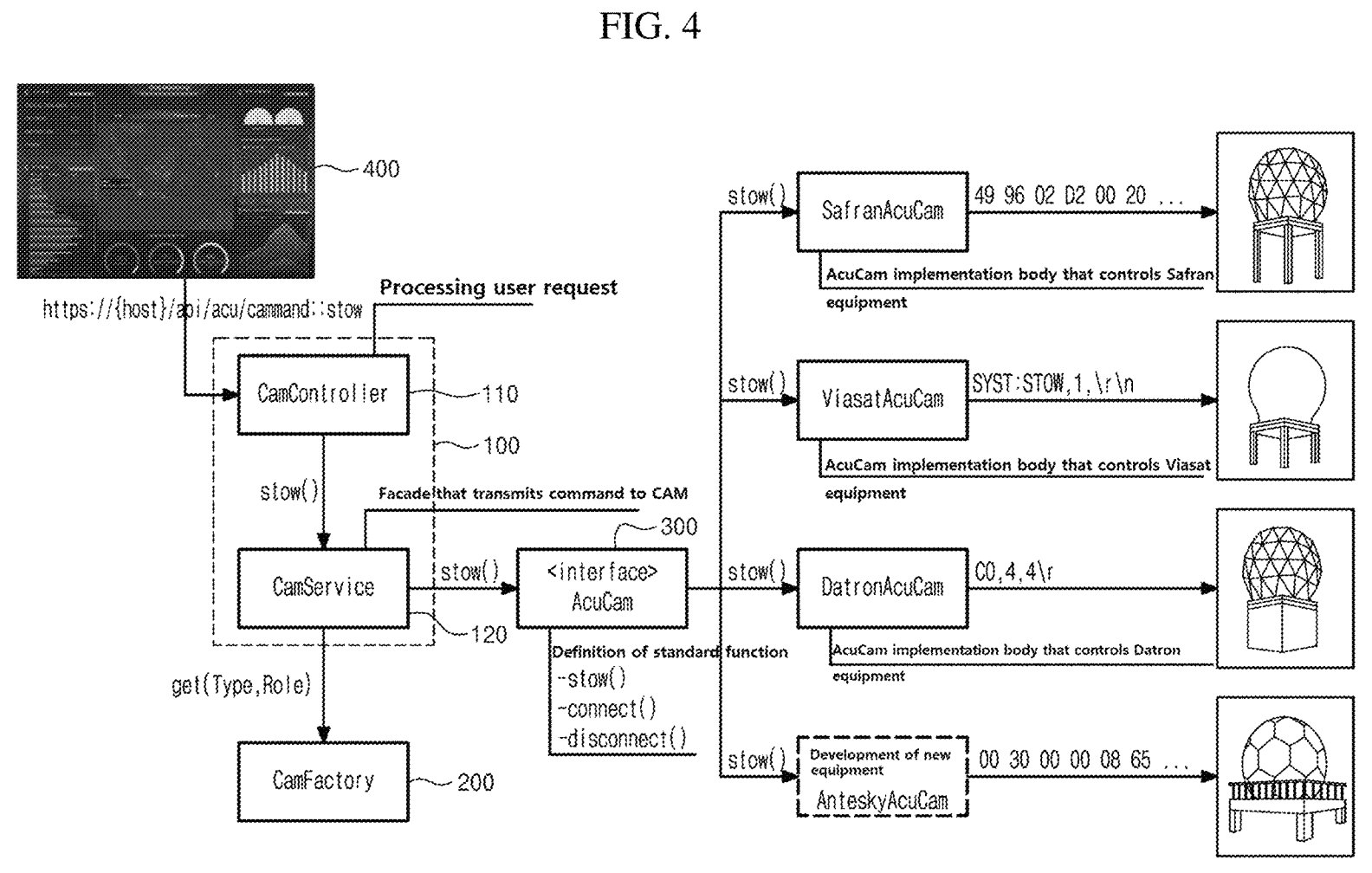

FIG. 4 illustrates a configuration of integrating and connecting antenna control units (ACUs) of different vendors to configure the ground station integrated control system of FIG. 3.

Technical features of a multi-vendor ground station integrated control system are described with reference to FIGS.

3 and 4. Referring to FIG. 3, the multi-vendor ground station integrated control system may minimize failure propagation through loose coupling, may easily add equipment with a standard interface, may replace multi-vendor equipment without changing a server during operation, and may operate a plurality of ground stations with the same code. Using the multi-vendor ground station integrated control system of the present invention, it is possible to achieve an operation automation through combination of heterogenous multi-vendor equipment.

Referring to FIGS. 3 and 4, through an application program interface (API), a controller 110 may receive and process a user request related to subsystems and ground stations using a stow( )command. The controller 110 may be Cam & Controller provided to the subsystems and the ground stations, but is not limited thereto, and may control equipment and parts provided to the subsystems and the ground stations.

A service configuration unit 120 interacting with the controller 110 may encapsulate a complex interface and may provide an integrated interface for the subsystems and the ground stations. The first processor 200 interacting with the service configuration unit 120 may encapsulate object generation and may control mutual dependencies to be separated when using the subsystems and the ground stations.

Therefore, if only an interface of new equipment or equipment to be replaced is implemented, the new equipment may be added or the equipment may be replaced. The second processor 300 may encapsulate actions of the subsystems and the ground station, may generate a replaceable configuration, and may perform a control operation according thereto.

The service configuration unit 120 may be implemented to generate a facade pattern. The first processor 200 may be implemented to generate a factory method pattern. The second processor 300 may be implemented to generate a strategy pattern. The second processor 300 may be interfaced with an antenna control unit (ACU) that controls antennas of the subsystems and the ground stations. The second processor 300 may define a standard function that is interfaced with each of devices of the subsystems and the ground stations, may exchange information with each device according to a standard function, and may control each device.

The term "facade" is a word that means "facade of a building" and refers to a design pattern that provides a simplified interface for a large code part of software.

A facade object reduces dependence of a code outside complex software on a code inside library and provides a simple and integrated interface for using complex software.

When generating an object as one of generation patterns in association with the factory method pattern, an instance of a class to be generated may be determined by a subclass. That is, instance generation is delegated to the subclass. A parent abstract class depends on only an interface and an implementation class to be called is implemented by a subclass. In this manner, although a new implementation class is added, a new factory may be added without modifying an existing factory code.

Regarding the strategy pattern, an interface of generating a strategy class for each of actions that objects may perform and encapsulating similar actions may be defined. The strategy pattern refers to a method of, in the case of desiring to dynamically change an action of an object, flexibly expanding an action by simply changing a strategy without directly modifying the action. That is, the strategy pattern refers to a pattern capable of generating each of actions that objects may perform as a strategy and if modification of an action is dynamically required, modifying the action by simply changing the strategy.

The controller 110 may interact with the service configuration unit 120 through a stow( ) command, and the service configuration unit 120 may interact with the first processor 200 through a get(Type, Role) command. The service configuration unit 120 may interact with the second processor 300 through the stow( )command. The first processor 200 may generate and search for an implementation body that implements the antenna control unit (ACU).

The second processor 300 may exchange information with each of devices according to a standard function defined with stow( ) connect( ) or disconnect( )command, and may control each of the devices. The interface configured by the second processor 300 may define a standard command of the antenna control unit (ACU) and, without being limited thereto, may be changed according to an application.

Meanwhile, operation software (C&M) of a multi-vendor ground station of the multi-vendor ground station integrated control system according to the present invention may be developed for each ground station and provided to a customer and, based thereon, maintenance and version update through upgrade may be implemented.

Meanwhile, a remote monitoring and control function, an authority function, and a key parameter function may be implemented to manage a plurality of ground stations and designed such that an operator may use the plurality of ground stations.

In this regard, by performing monitoring and control not only in a ground station but also in a remote location, equipment of multiple ground stations and multiple companies may be designed to be operated in one ground station. Equipment monitoring and control, mission performance, satellite tracking, and performance test functions configured for the purpose of missions may be implemented in a local ground station and may be designed to be performed even in a remote location.

Operation software is in charge of data transmission in a plurality of sites and remote monitoring and control data needs to be designed to transmit minimal data. Launch vehicle tracking data needs to be simplified to monitor a remote situation through satellite communication and designed, developed, and operated to perform an optimal monitoring function.

Each integrated operation software needs to be designed/developed such that a vendor used for each ground station may be selected as at least heterogeneous type based on customer and operational conditions and may develop software step-by-step and integrally operate a ground station of a different vendor for operational convenience. Accordingly, although any customer requests, development may be performed without disruption in operation by simply changing only some interfaces.

When performing a launch mission of a satellite, a location of a launch vehicle may be tracked by controlling an antenna and data received from the launch vehicle may be collected and used to analyze launch vehicle information. Through development of integrated operation software, integrated control technology of multi-vendors may be implemented. Through this, software may be supplied by integrating all vendors required by a customer. Also, even in the case of replacing equipment in operation with alternative equipment in response to a request from the customer, if an equipment interface (ICD) is provided, upgrade may be immediately performed such that there is no disruption to operation.

To this end, universally available integrated control software for ground stations may be designed by analyzing requirements of multiple customers and by collecting various satellite communication specifications. Such integrated software may be developed to be capable of controlling even other equipment with the same function of different manufacturers. Through this, it is possible to reduce an amount of time and resources consumed for development of control software for individual ground stations.

Also, such software may be designed to be quickly applicable even when equipment and parts are replaced or upgraded. Detailed technology and features of multi-vendor ground station integrated control may be summarized as follows. The ground station integrated control system may monitor and control a ground station through combination of multi-vendor equipment. Since equipment for space communication is not standardized and an interface type is diverse, a considerable amount of resources may be invested for development of control software when developing a ground station. In this regard, although some equipment is replaced, it is possible to control equipment without separate additional development. Also, through interface modularization design, it is possible to easily mount a necessary function through interface document (ICD) analysis of new equipment and to quickly connect the equipment.

In this regard, subsystems and ground stations may be equipped with interfaces, such as a plurality of antenna controllers, modems, spectrum analyzers, and frequency converters, and may provide customers with freedom and convenience in selecting equipment.

The equipment to be mounted on the subsystems and the ground stations may include an antenna system, a modem that is modulation/demodulation equipment, a high power amplifier (HPA), a radio frequency (RF) switch matrix, and an RF signal generator. Also, the equipment may include a frequency up/down-converter, a global positioning system (GPS) receiver, and other devices, for example, an RF signal storage device and an optical conversion device.

In association with a list of interfaces actually mounted to the integrated control system according to the present invention, equipment of TOPcis, BHE, Adtech, etc., may be used immediately only by network connection as an example of software for ground station services.

Meanwhile, as an example of the antenna system, equipment of at least one of Safran Electronics (Pro/Vision/Legion), Orbital Systems, Datron Advanced Technologies, Viasat, Nextmove Technologies, and Sea Tel Inc and Antesky may be used.

Meanwhile, in relation to the development of the integrated control system according to the present invention, although the same command is input, even equipment having the same function may operate differently due to a difference in operation or communication methods. To prevent such an issue, it is important to test and analyze an operating environment and method of each piece of equipment and to secure equality of interfaces.

In this regard, the integrated control system according to the present invention may support an "integrated ICD." and may be designed to control different commands of equipment having the same purpose using a unified command. Therefore, even different equipment may be quickly controlled through a consistent user interface (UI) on a dashboard.

FIG. 5 illustrates an example of integrated ICD of an integrated control system according to the present invention.

Referring to FIG. 5, a control command may be generated using a ground station ID, an equipment ID, a model ID, an item, and OP CODE. Corresponding equipment may be controlled with a control command corresponding to OP CODE in consideration of an equipment model of a ground station corresponding to the ground station ID, the equipment ID, and the model ID. Ground stations may be controlled through integrated ICD configured with the ground station ID, the equipment ID, the model ID, the item, and the OP CODE and individual ICD. In detail, first ground stations J07A and J07B may be individually controlled according to the individual ICD and a second ground station K07 may be integrally controlled according to the integrated ICD.

An integrated control and monitoring method may integrally or simultaneously control each ground station with one piece of software instead of using individual software. In the recent satellite industry, constellation development is in trend and a satellite system is being developed with low cost for large data collection by manufacturing a plurality of satellites with the same specifications. Therefore, ground stations are being developed using a method of simultaneously operating the plurality of ground stations for constellation control and an integrated control method for such ground stations is required.

In this regard, a ground station integrated control system capable of integrating and operating 20 or more ground stations starting from a single ground station may be considered. Theoretically, the number of integrable ground stations may be expanded infinitely. The integrated control system according to the present invention may provide a service with single software by grouping domestic and foreign ground station networks into one.

FIG. 6 illustrates an example of a registration situation of ground stations connected to a ground station integrated control system according to the present invention.

Referring to FIG. 6, information related to name, latitude, longitude, elevation, pre-pass second (sec.), post-pass second (sec.), frequency band (bands), and software type may be displayed for each ground station.

Meanwhile, a configuration of a portion of the integrated control system according to the present invention may be modified depending on whether each ground station is equipped with equipment. Regardless of whether equipment is built and different quantity, a consistent UI may be provided for familiar and quick adaptation of the user although a shape of a ground station is changed. In this regard, screen information of the display 400 of FIG. 4 may be a control screen for controlling equipment of ground stations that are deployed in different areas. In this regard, although different ground stations are deployed in different areas, the same UI may be provided. Here, an upper end of a window may be configured as a menu that allows the user to verify a current mission and to generate a schedule and a left screen may display an orientation state of an antenna. A middle screen may display an equipment construction status of each ground station and may display an operation state and settings of each equipment and a right screen may display a communication state with a satellite.

The multi-vendor ground station integrated control system of the present invention is described with reference to FIGS. 1 to 6. The ground station integrated control system may include the integrated interface unit 100, the first processor 200, and the second processor 300.

The integrated interface unit 100 provides a ground station integrated interface through which multi-vendor equipment and parts are compatible to operate an artificial satellite. The first processor 200 may operably couple to the integrated interface unit 100. The first processor 200 may be configured to separate dependencies between subsystems when interacting with the subsystems. In this regard, the integrated control device of the ground station integrated control system may interact with the subsystems. Therefore, although some equipment and parts are newly added or replaced in the subsystems, it is possible to individually and independently control each piece of equipment and parts according to a system analysis method in which mutual dependencies are removed.

The second processor 300 may operably couple to vendor equipment having different forms of ground stations and the second processor 300 may be configured to collect motion generated from the ground stations and control equipment of the ground stations.

When equipment of a plurality of manufacturers is connected to the subsystems, the second processor 300 may obtain equipment state information of the plurality of manufacturers. The second processor 300 may perform control operations related to a stow state and a connect state of equipment of the ground stations based on the obtained state information of the equipment and motions generated from the ground stations in conjunction with the integrated interface unit 100 and the first processor 200.

When a configuration method of the connected equipment is selected by a user, the control operations may be performed based on the selected configuration method of the connected equipment. The state information of the equipment may include antenna diameter, operating frequency, and manufacturer information used in the subsystems. Therefore, although various types of equipment and parts, such as antenna, modem, and transmitter, are connected to a product of any manufacturer through integrated operation software for ground stations, modularization may be implemented by configuring the configuration method in a selectable form through software.

When new equipment is added to the ground stations, the second processor 300 may perform a control operation. When the new equipment is added to the ground stations, the second processor 300 may perform control operations related to stow, connect, and disconnect of the new equipment in conjunction with the integrated interface unit 100 and the first processor 200. When it is determined that the new equipment is normally stowed and connected and normally compatible with other equipment, the second processor 300 may transmit a message indicating a normal operation state to the new equipment and the equipment connected to the new equipment.

The integrated interface unit 100 may include the controller 110 and the service configuration unit 120. The controller 110 may be configured to interface with the subsystems in response to a user request. For example, the controller 110 may be configured to interface with a module that interacts with the subsystems in response to the user request.

The service configuration unit 120 may operably couple to the controller 110. The service configuration unit 120 may generate a facade object related to an integrated interface between the subsystems, and may configure a facade pattern. The service configuration unit 120 implemented with the facade pattern may encapsulate a plurality of complex interfaces related to a plurality of subsystems and a plurality of ground stations and may provide the integrated interface to the subsystems.

The service configuration unit 120 may be configured to transmit a first command to the first processor 200 and a second command to the second processor 300 according to the facade pattern. The first processor 200 may operably couple to the service configuration unit 120. The first processor 200 may search for equipment of antenna control units in response to the first command and may generate first control commands for controlling the equipment.

The second processor 300 may operably couple to the service configuration unit 120. The second processor 300 may generate second control commands related to stow, connect, and disconnect of the equipment in response to the second command. The second processor 300 may transmit the generated second commands to antenna control units. Therefore, the antenna control units may control a stow state and a connect state of the equipment.

The second processor 300 may perform a control operation according to replaced equipment and part information in the subsystems. The second processor 300 may monitor and control the equipment of the ground stations and, in response to occurrence of abnormality, may generate replacement information related to replacement of at least some of the equipment. As the equipment is replaced according to the generated replacement information, the second processor 300 may transmit control commands to antenna control units of the replaced equipment in conjunction with the integrated interface unit 100 and the first processor 200.

The second processor 300 may control the antenna control units such that the antenna control units may control a stow state and a connect state of the replaced equipment. When it is determined that the replaced equipment is normally stowed and connected and normally compatible with other equipment, the second processor 300 may perform a specific operation. Therefore, the second processor 300 may transmit a message indicating a normal operation state to the replaced equipment and equipment connected to the replaced equipment.

The aforementioned features and effect of the present invention will become more apparent through the detailed description related to the accompanying drawings and accordingly, one skilled in the art to which the present invention pertains may easily carry out the technical spirit of the present invention.

According to software implementation, design and parameter optimization of each of components as well as procedures and functions described in the present specification may be implemented as a separate software module. A software code may be implemented with a software application written in any appropriate program language. The software code may be stored in a memory and may be executed by a controller or a processor.

What is claimed is:

1. A multi-vendor ground station integrated control system comprising:

an integrated interface unit configured to provide a ground station integrated interface through which multi-vendor equipment and parts are compatible to operate an artificial satellite;

a first processor configured to operably couple to the integrated interface unit and separate dependencies between subsystems when interacting with the subsystems; and a second processor configured to operably couple to vendor equipment having different forms of the ground stations, collect motions generated from the ground stations, and control equipment of the ground stations, wherein the integrated interface unit comprises:

a controller configured to interface with the subsystems in response to a user request; and a service configuration unit configured to operably couple to the controller, generate a facade object related to an integrated interface between the subsystems, configure a facade pattern, and transmit a first command to the first processor and a second command to the second processor according to the facade pattern.

2. The ground station integrated control system of claim 1, wherein the second processor is configured to:

when equipment of a plurality of manufacturers is connected to the subsystems, obtain state information of the connected equipment of the plurality of manufacturers, and perform control operations related to a stow state and a connect state of the equipment of the ground stations based on the obtained state information of the equipment and motions generated from the ground stations in conjunction with the integrated interface unit and the first processor, and when a configuration method of the connected equipment is selected by a user, the control operations are performed based on the selected configuration method of the connected equipment.

3. The ground station integrated control system of claim 1, wherein the second processor is configured to:

when new equipment is added to the ground stations, perform control operations related to stow, connect, and disconnect of the new equipment in conjunction with the integrated interface unit and the first processor, and when it is determined that the new equipment is normally stowed and connected and normally compatible with other equipment, transmit a message indicating a normal operation state to the new equipment and equipment connected to the new equipment.

4. The ground station integrated control system of claim 1, wherein the first processor is configured to operably couple to the service configuration unit, and generate first control commands for controlling the equipment by changing to a command for controlling the controller in response to the first command.

5. The ground station integrated control system of claim 4, further comprising:

antenna control units, and wherein the second processor is configured to:

operably couple to the service configuration unit and generate second control commands related to stow, connect, and disconnect of the equipment in response to the second command, and transmit the generated second control commands to the antenna control units such that the antenna control units control a stow state and a connect state of the equipment.

6. The ground station integrated control system of claim 5, wherein the second processor is configured to:

generate replacement information related to replacement of at least some of the equipment in response to occurrence of abnormality by monitoring and controlling the equipment of the ground stations, in response to the equipment being replaced according to the generated replacement information, transmit control commands to the antenna control units of the replaced equipment in conjunction with the integrated interface unit and the first processor, control the antenna control units such that the antenna control units control a stow state and a connect state of the replaced equipment, and when it is determined that the replaced equipment is normally stowed and connected and normally compatible with other equipment, transmit a message indicating a normal operation state to the replaced equipment and equipment connected to the replaced equipment.

* * * * *